United States Patent [19]

Butler

[11] 4,017,215
[45] Apr. 12, 1977

[54] INFINITELY VARIABLE ORIFICE FOR PART THROTTLE CONTROL

[75] Inventor: Ralph G. Butler, Chicago, Ill.
[73] Assignee: Caterpillar Tractor Co., Peoria, Ill.
[22] Filed: Mar. 15, 1976
[21] Appl. No.: 666,722
[52] U.S. Cl. .............................. 417/216; 60/423; 60/428; 60/447; 417/326
[51] Int. Cl.² ................... F04B 49/00; F16D 31/02
[58] Field of Search ............ 417/34, 216, 218–222, 417/326; 60/423, 428, 447, 465, 494

[56] References Cited
UNITED STATES PATENTS
3,963,378  6/1976  McMillan .......................... 417/216

Primary Examiner—Carlton R. Croyle
Assistant Examiner—G. P. LaPointe
Attorney, Agent, or Firm—Phillips, Moore, Weissenberger, Lempio & Majestic

[57] ABSTRACT

A hydraulic power system having a plurality of variable displacement pumps for supplying pressurized fluid for manipulation of one or more implements includes control means operative to automatically adjust pump displacement to the output horsepower of a prime mover driving the pumps of a system. The control means includes an underspeed valve responsive to a deviation in the speed of the prime mover from any one of a wide range of selected speeds to transmit a fluid pressure signal to servo control means for adjusting the displacement of the pumps in proportion to engine output. The control means includes an infinitely variable orifice adjustable with throttle movement for adjusting the underspeed valve to respond to a deviation from a wide range of selected engine speeds.

4 Claims, 2 Drawing Figures

INFINITELY VARIABLE ORIFICE FOR PART THROTTLE CONTROL

BACKGROUND OF THE INVENTION

The present invention is directed to hydraulic control systems, and pertains more particularly to an improvement in control systems such as disclosed in Ser. No. 583,366 entitled Part Throttle Control-Pump Override, now U.S. Pat. No. 3,963,378, assigned to the assignee hereof and having a plurality of variable displacement pumps and means for automatically adjusting the displacement of the pumps to engine output.

Many hydraulically acutated implements, such as a hydraulic excavator, normally employ a plurality of variable displacement pumps for supplying the high-pressure hydraulic fluid necessary to power the many motors employed in driving the vehicle and in manipulating the excavator bucket and linkage. Reference is made to U.S. Pat. No. 3,841,795 issued Oct. 15, 1974 to Ferre et al., assigned to the assignee hereof, for background material pertinent to the subject invention. The above patent was developed to overcome certain problems of the prior art and functions very satisfactorily so long as a single predetermined engine speed or engine normal operating speed is selected and maintained.

Earth-moving machines, such as the hydraulic excavator, are normally designed to have a predetermined normal operating speed of the engine during normal operation of the machine. With such machines, the engine throtte is normally set at a predetermined position when the machine is in normal operation.

Frequently, it is desirable to operate the vehicle at a lower or higher engine speed. This becomes a problem when the hydraulic system is equipped with a control system such as that of U.S. Pat. No. 3,841,795. With such a system, as soon as the engine speed is reduced, the differential pressure across the underspeed valve orifices would signal the pumps of the system to stroke to a lower displacement as they would respond as though the engine was running slower due to lugging of the engine due to overload. Thus, one would be unable with that system to operate the vehicle with the engine at a lower speed and at the same time obtain full pump flow from the pumps.

The control system disclosed in the aforementioned copending application Ser. No. 583,366 provides for adjusting the control system to respond to another speed other than the normal operating speed of the system. However, that too has limited flexibility in that only a single other speed is available.

SUMMARY AND OBJECTS OF THE INVENTION

It is the primary object of the present invention to provide horsepower controlling means for a hydraulic system that is operative to overcome the above problems of the prior art.

Another object of the present invention is to provide horsepower controlling means for hydraulic systems having a plurality of variable displacement pumps with infinitely variable speed-responsive means to vary the speed-responsive means of the system to an infinite number of selected operating speeds.

In accordance with the primary aspect of the present invention, a hydraulic control system having a plurality of variable displacement pumps, and underspeed valve means responsive to the output of the engine is provided with infinitely variable means variable with engine throttle for varying the underspeed valve means so that the system responds to an infinite number of operating positions or speeds of the engine.

BRIEF DESCRIPTION OF THE DRAWINGS

The above and other objects and advantages of the present system will become apparent from the following description when read in conjunction with the drawings, wherein.

DETAILED DESCRIPTION OF THE PREFERRED EMBODIMENT

Figure 1:
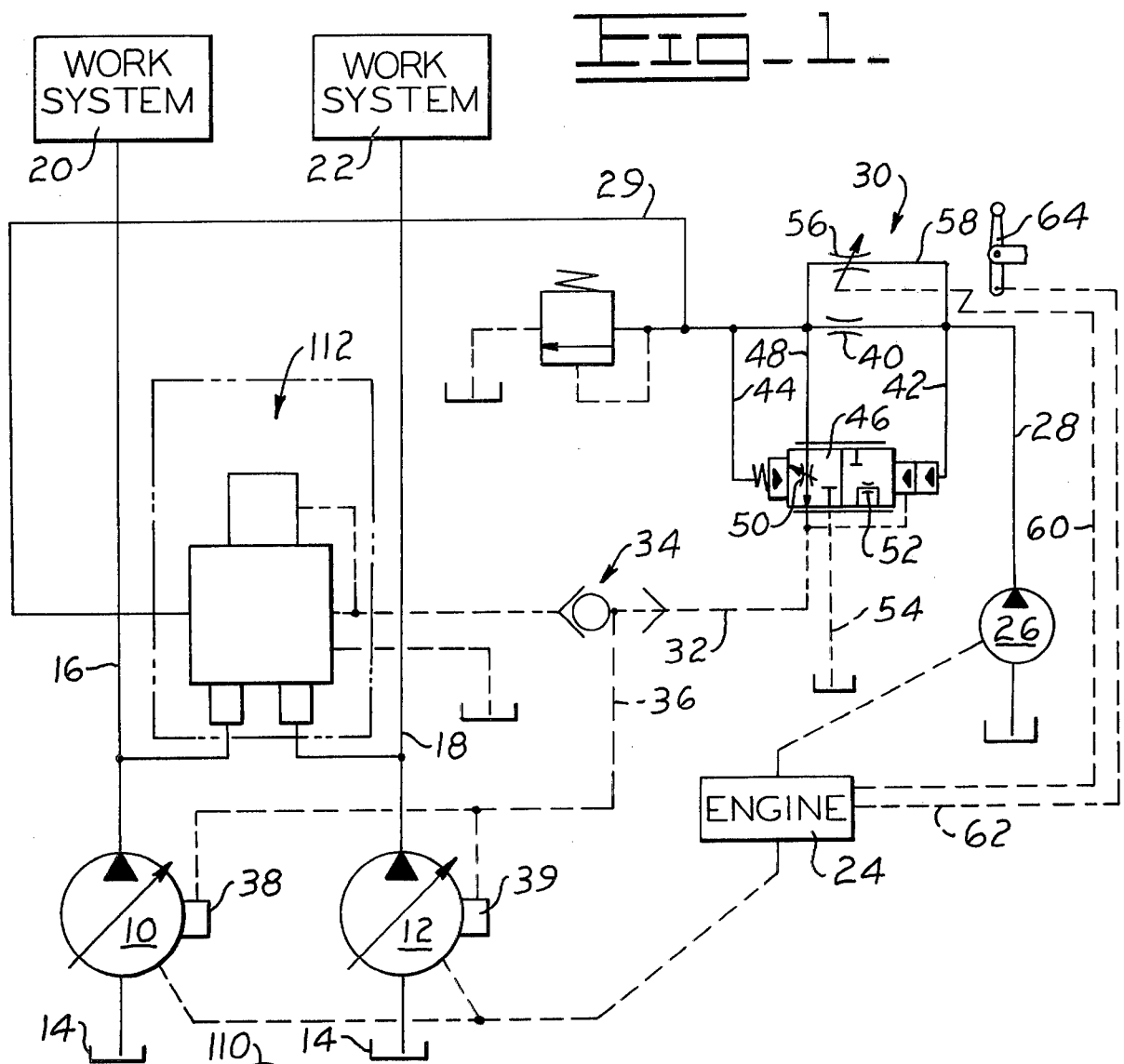
FIG. 1 is a schematic layout of a hydraulic control system embodying the present invention; and, FIG. 2 is an elevational view in section of a portion of the system of FIG. 1.

Referring to the drawing, a hydraulic control system embodying the present invention is schematically illustrated in operative combination with a multiple pump implement control circuit, a portion of which is illustrated. The implement control circuit is of the type that would be utilized in a machine such as a hydraulic excavator or the like wherein a plurality of hydraulic motors are used in combination individually and/or simultaneously for the manipulation of an implement.

The system comprises a plurality of variable displacement pumps 10 and 12 which draw fluid from a reservoir 14 and supplied by way of output or supply lines or conduits 16 and 18 respectively to work systems 20 and 22. Work systems 20 and 22 may be any suitable arrangement of valves and motors for providing power for operation of implements or the like such as that illustrated, for example, in U.S. Pat. No. 3,759,292 issued Sept. 18, 1973 to Bianchetta et al, which is incorporated herein by reference.

The pumps 10 and 12 are variable displacement pumps and are driven by common prime mover means such as an internal combustion engine 24 which is operatively connected to drive a fixed displacement pump 26 which supplies pilot fluid for performing certain control functions within the system. Among these functions are the control of the variable displacement pumps 10 and 12. Pilot fluid from the pump 26 is supplied by way of a pilot supply line 28 to an underspreed valve assembly indicated generally at 30 which is operative under certain conditions to transmit a signal by way of the pilot control line 32, a shuttle valve 34, a pilot control line 36 to servocontrol means of actuators 38 and 39 of the pumps 10 and 12 respectively. The servo actuators are responsive to certain pressure signals to reduce the displacement of the respective pumps 10 and 12.

The underspeed valve assembly 30 includes a primary orifice 40 which receives flow by way of conduit 28, causing a differential pressure, which pressure is communicated by way of conduits 42 and 44 to the ends of a pressure-controlled pilot valve 46. This signal pressure communicated by way of the conduits 42 and 44 acts on pressure-controlled pilot valve 46 to shift it to various positions including the position shown wherein pilot fluid is communicated by way of a passage 48 and across an adjustably restricted passage 50 of the valve to the pilot control line 32 which is then communicated to the pump's servo actuators 38 and 39 for reducing the displacement of the pumps. The pressure-controlled pilot valve 46 includes the variably restricted passage 50 for communicating between pilot passage 48 and pilot control line 32 when the valve 46 is in a certain position as illustrated. A restricted passage 52 provides communication between the pilot control line 32 and return passage 54 to tank 14 for venting passage 32 and pilot control line 36.

The underspeed valve 30 also includes an infinitely variable passage such as a variable orifice or restriction 56 which is in parallel with orifice 40 and connected to the engine throttle for movement therewith to adjust the signal pressure for positioning the pressure-responsive pilot valve 46 for a large or wide range of operating speeds of the engine 24. For example, when the vehicle engine is running at a predetermined or selected operating speed, the pilot pump is producing a predetermined amount of flow to the control system. The pressure differential across the orifice 40 is an amount necessary to maintain the pressure-responsive pilot valve 46 in its unloading position, that is, with pilot control line 32 communicating with the return passage 54, thus resulting in relieving pressure signal against the servocontrol actuators 38 and 39. As the engine speed drops in response to a load on the system, the pilot pump 26 begins to slow down and produces less fluid flow through pilot supply line 28 and across orifice 40, the pressure differential will cause shifting of the pressure-responsive pilot valve 46 to the position as shown and will communicate a modified pilot pressure to the pump servocontrols 38 and 39 by way of the conduits 48, 32, 34, 36 for the stroking of the pumps 10 and 12 to some angle which will allow the engine to regain its normal speed.

The infinitely variable passage 56 is placed in a line 58 parallel to the orifice or restriction 40. This arrangement allows an adjustment of the effective orifice between pilot supply line 28 and the pilot line 29, which is a continuation downstream of valve 30. Thus, with the variable passage or restriction 56 the pressure drop between lines 42 and 44 may be infinitely varied to vary the response of the valve 46 in response to the speed of the vehicle engine and output of the pump 26.

In this embodiment, the variable restriction or passage 56 is connected to suitable linkage means 60, which in turn is connected to throttle linkage 62 and throttle control lever 64 for controlling the speed of the engine 24. The setting of the variable orifice 56 is made infinitely variable and is directly related to the throttle setting for the engine. Thus, the underspeed valve 30 is immediately adjusted to the speed of the engine so that the underspeed valve responds normally to any throttle setting of the engine within limits. Thus, the underspeed valve assembly, in this embodiment, would be an automatic response to a deviation from any predetermined engine speed which engine speed is predetermined automatically by the throttle or governor setting.

Figure 2:
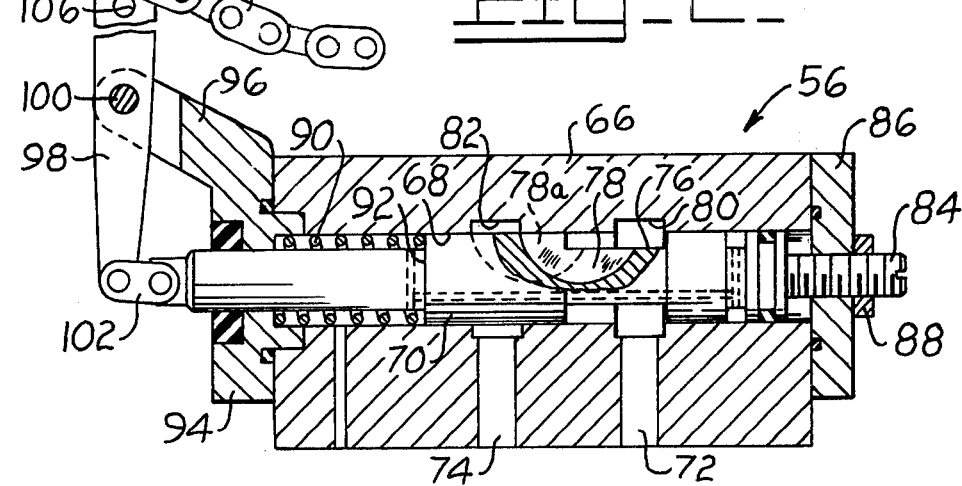

Turning now to FIG. 2 of the drawing, there is illustrated an embodiment of a variable orifice as in the present invention. The variable orifice arrangement comprises a housing 66 comprising or including a central cylindrical throughbore 68 in which is reciprocably mounted a valve spool 70. An inlet 72 and an outlet 74 communicate with the throughbore. The valve spool 70 includes an annular groove 76 and a longitudinal slot 78 cooperating therewith for providing communication between the inlet 72 and the outlet 74.

The slot 78 extends from the annular groove portion 76 of the spool 70 to the adjacent cylindrical body of the spool and variably communicates between annular grooves 80 and 82 formed in the bore 68 which communicates respectively with inlet 72 and outlet 74. The spool 70 is preferably mounted within bore 68 such that a forward edge 78a of slot 78 is covered by the walls of the bore 68 preventing communication of fluid between passages 72 and 74. As the spool 70 is progressively moved leftward, the forward edge 78a of slot 78 is gradually uncovered progressively enlarging the passage made by slot 78 between passages 72 and 74.

The spool 70 is reciprocably mounted within the bore 70 and engages an adjustable stop 84 formed such as by a screw 84 threadably mounted within an end cover or cap 86 of the valve housing. A lock or jam nut 87 may be provided for locking the screw into position. This stop means provides adjusting means for adjusting the position of forward edge 78a and slot 78 within the bore at the minimum or no-communicating position of the variable orifice.

The spool is normally biased by suitable means such as a compression spring 90 into engagement with stop means 84. The spring 90 is disposed between a shoulder 92 on spool 70 and end cap 94. The end cap 94 includes a bracket 96 on which is pivotally mounted a lever 98 by suitable pin means 100. The lever 98 is connected at its lower end to the end of spool 70 by a suitable link 102. Linkage means 60 is pivotally connected to the upper end by suitable pin means. The upper lever arm may be adjusted by mounting the pin 104 and end of link 60 in any one of a number of holes 106, 108 and 110.

It will be seen that movement of the linkage 60 which is tied to the throttle lever 64 to move therewith moves the spool 70 and thereby modifies the passage and fluid flow between passages 72 and 74.

This control system permits the underspeed valve asssembly 30 to be adjusted to respond to load on the system at an infinite number of engine speed settings. Typically the system would be set to begin responding at some speed above normal idle of the engine and vary therewith to the maximum engine speed permissible. This provides a substantially infinite operating range for the system.

The system may also include a summing valve assembly 112 which is responsive to excessive pressure in the work system to override the underspeed valve system.

Thus, from the above description it is seen that there is provided a control system for hydraulic systems having an underspeed valve that is infinitely adjustable with engine speed and is responsive to a deviation from the selected speed to alter displacement of variable displacement pumps within the system.

I claim:

1. A hydraulic system including the combination of a plurality of variable displacement pumps driven by a single prime mover, and a horsepower-controlling system for controlling the horsepower output of the variable displacement pumps, said system comprising:
   a source of pilot pressure including a fixed displacement pump driven by said prime mover for controlling displacement of said pumps in relation to the speed output of said prime mover;
   throttle control means for controllably selecting the speed of said prime mover;
   underspeed control valve means responsive to a deviation from selected operating speeds of said prime mover for normally controlling the communication of said pilot control pressure with said pump displacement means to thereby vary the displacement of said pumps in proportion to load thereon; and, infinitely variable means movable with said throttle control means for adjusting the response of said underspeed valve to respond to a deviation from said operating speed.

2. The hydraulic system of claim 1 wherein said variable means comprises variable fluid flow control means connected in parallel with said underspeed control valve means, and connected to said throttle control means for adjusting the flow of fluid through said underspeed control valve means.

3. The hydraulic system of claim 2 wherein said underspeed control valve means includes an orifice for developing a pressure drop in proportion to the output of said fixed displacement pump for controlling communication of said pilot pressure, and said variable fluid flow control means includes a valve for controlling the flow of fluid through said orifice.

4. The hydraulic system of claim 3 comprising:
a housing;
a bore in said housing;
an inlet port and an outlet port communicating with said bore;
a valve spool slidably mounted in said bore;
linkage means connecting said valve spool to said throttle control means; and
a slot formed in and extending longitudinally of said spool, the cross-sectional area of said slot varying along the length thereof, said slot defining a variable area passageway providing variable communication between said inlet and said outlet ports in response to movement of said spool in said bore.

* * * * *